(12) United States Patent
Winterot et al.

(10) Patent No.: US 10,139,612 B2
(45) Date of Patent: Nov. 27, 2018

(54) IMAGE-CAPTURING DEVICE WITH A MOVING DEVICE FOR A DIGITAL MICROSCOPE, AND DIGITAL MICROSCOPE

(71) Applicant: Carl Zeiss Microscopy GmbH, Jena (DE)

(72) Inventors: Johannes Winterot, Jena (DE); Uwe Wolf, Magdala (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 63 days.

(21) Appl. No.: 15/038,074

(22) PCT Filed: Dec. 3, 2014

(86) PCT No.: PCT/EP2014/076327
§ 371 (c)(1),
(2) Date: May 20, 2016

(87) PCT Pub. No.: WO2015/086387
PCT Pub. Date: Jun. 18, 2015

(65) Prior Publication Data
US 2016/0306158 A1    Oct. 20, 2016

(30) Foreign Application Priority Data

Dec. 9, 2013    (DE) .................. 10 2013 225 287

(51) Int. Cl.
*G02B 27/64*    (2006.01)
*G02B 21/00*    (2006.01)
(Continued)

(52) U.S. Cl.
CPC .......... *G02B 21/365* (2013.01); *G02B 21/362* (2013.01); *G02B 27/646* (2013.01); *H04N 5/2251* (2013.01); *H04N 5/349* (2013.01)

(58) Field of Classification Search
CPC .......... G02B 7/02; G02B 7/021; G02B 7/023; G02B 21/00; G02B 21/0008;
(Continued)

(56) References Cited

U.S. PATENT DOCUMENTS 5,637,861 A * 6/1997 Okada .................. H04N 3/1587
250/208.1
6,397,008 B2    5/2002 Kuwana et al.
(Continued)

FOREIGN PATENT DOCUMENTS

DE    69 528 915    7/2003
JP    2008-065340    3/2008
(Continued)

*Primary Examiner* — Thong Nguyen
(74) *Attorney, Agent, or Firm* — Nixon Peabody LLP; Jeffrey L. Costellia

(57) ABSTRACT

An image-capturing device for a digital microscope is provided. The image-capturing device includes a camera sensor, an optical unit for imaging a sample in an image plane on the camera sensor The optical unit includes at least one lens group which is mounted so as to be movable perpendicularly with respect to an optical axis, and a moving device with a first drive for the relative movement of at least one part of the movably mounted lens group and thus of the imaging of the sample on the camera sensor parallel to the image plane. The first drive is coupled to the movably mounted part of the lens group via a first flexure bearing formed in the moving device.

7 Claims, 4 Drawing Sheets

(51) Int. Cl.
*G02B 21/36* (2006.01)
*H04N 5/349* (2011.01)
*H04N 5/225* (2006.01)

(58) Field of Classification Search
CPC ............ G02B 21/0012; G02B 21/0016; G02B 21/002; G02B 21/362; G02B 27/64; G02B 27/646
See application file for complete search history.

(56) References Cited

U.S. PATENT DOCUMENTS

| | | | |
|---|---|---|---|
| 7,800,847 B2* | 9/2010 | Nagai | G02B 7/023 359/813 |
| 8,547,652 B2* | 10/2013 | Bornschein | G02B 7/004 359/811 |
| 2010/0080545 A1* | 4/2010 | Fan | G03B 5/02 396/55 |
| 2011/0158618 A1* | 6/2011 | Ibi | G02B 7/102 396/55 |
| 2012/0092768 A1* | 4/2012 | Shiraki | G02B 27/646 359/557 |
| 2012/0154614 A1* | 6/2012 | Moriya | G03B 3/10 348/208.5 |
| 2015/0022130 A1* | 1/2015 | Yoshimuta | H02P 6/24 318/400.15 |

FOREIGN PATENT DOCUMENTS

| | | |
|---|---|---|
| JP | 2012-163616 | 8/2012 |
| JP | 2012-163910 A | 8/2012 |

* cited by examiner

IMAGE-CAPTURING DEVICE WITH A MOVING DEVICE FOR A DIGITAL MICROSCOPE, AND DIGITAL MICROSCOPE

FIELD OF INVENTION

The present invention relates to an image-capturing device with a moving device (pixel shift unit) for a digital microscope for the relative movement of an imaging of a sample on a camera sensor parallel to an image plane, and to a digital microscope having such an image-capturing device.

BACKGROUND

Pixel shift technology has been used for some time, in particular in the digital camera sector, to obtain an improvement in resolution and image quality. The method is used for image stabilization, for resolution enhancement and for protecting the color information for sensors with color pixels. At present, there are also many applications in microscopy.

In pixel shift technology, as it is to be understood in the present application, the camera sensor is used to take two or more images in which the optical imaging of the object relative to the camera sensor is shifted by one pixel or less in the horizontal and/or vertical direction and is thus imaged on a slightly displaced region of the camera sensor. Either the camera sensor or an optical element can be actively moved. From the recorded individual images, a qualitatively better image is then calculated using known image processing methods.

JP 2012-163910 A discloses a microscope in which an image-shifting device for resolution enhancement is arranged in the optical path. This device shifts the optical imaging according to the settings of an actuator. A parallel plate glass with projections is inclined by a rotatable cam ring. The cam ring is driven by a motor. The production of the parallel plate glass with the projections is relatively costly. The positions of the projections firmly define the path of movement. As a more rapid alternative to the cam ring, the use of DMDs (digital micromirror devices) is proposed, their inclination adjusting the path of movement of the optical imaging. Various possibilities are covered by the term microscanning.

DE 69 528 915 T2 describes a pixel shift method for a camera, in which a mirror or a rotary prism is tilted to move the image or a lens group is moved vertically. In this method, it is possible to select the operating mode of the camera and therefore either an image stabilization or an enhanced resolution.

JP 2008 065 340 A discloses a microscope with two image-capturing devices at high speed and low speed and with an objective separate from the microscope. The objective is movable by means of a complicated mechanism using drives in order to calculate movements of the objective from the images. The movement of the entire objective can only take place relatively slowly.

JP 2012 163 616 discloses a zoom objective that uses pixel shift for image stabilization. The zoom objective comprises several lens groups, of which one is movable. A vibration detector detects vibrations of the zoom, and an actuator is controlled according to the vibrations in order to move a lens group perpendicularly with respect to the optical axis.

U.S. Pat. No. 6,397,008 B2 discloses a camera with an image stabilizer. The movement of the camera is established by means of acceleration sensors and, from this, the control of the actuator for the lens movement is determined. The lens is mounted resiliently at three points by means of slide bearings.

SUMMARY

An image-capturing device for a digital microscope is provided. The image-capturing device includes a rapid and extremely precise pixel shift device that can be produced cost-effectively.

An image-capturing device can include a camera sensor for detecting an image of a sample, an optical unit for generating the imaging of the sample on the camera sensor, and a moving device for moving the imaging on the camera sensor. The moving device, in this case, includes a drive for the relative movement of at least one part of a movably mounted lens group of the optical unit. According to the invention, the first drive is coupled to the movably mounted part of the lens group by way of a first flexure bearing formed in the moving device.

In some embodiments, a digital microscope can include an image-capturing device.

In a preferred embodiment, the camera sensor is a CMOS sensor. It should be understood by one of ordinary skill in the art that any other suitable camera sensor can be used. For example, the sensor could also be a CCD sensor with a Bayer pattern.

The optical unit is preferably part of the optics that are required anyway in the digital microscope and that preferably include an objective and a zoom assembly. In most embodiments, objective and zoom assembly are spatially separate assemblies, wherein the zoom assembly is or can be integrated in what is called an "optical engine." In some embodiments, the optical engine can include control components and image processing components of the digital microscope. However, it is likewise possible, that the zoom assembly can be integrated in the objective.

According to the invention, the moving device (pixel shift unit) is integrated in a movable lens group of the optical unit, wherein at least one part of the lens group can be actively moved by a first drive, which is preferably a piezo actuator, perpendicularly with respect to an optical axis, and the first drive is coupled to the movable part of the lens group by means of a flexure bearing. In some embodiments, the piezo actuator can be a stack of individual piezo actuators.

A flexure bearing within the meaning of this invention is understood as a monolithic structure with a specific deformation behavior, which carries or receives at least the movable part of the lens group and has a contact point for the piezo actuator.

In a preferred embodiment of the invention, the flexure bearing is formed in a monolithic base body, in the radially central area of which the movable part of the lens group is mounted in a lens opening, and in the radially peripheral actuator area of which a contact point for the first drive is provided.

A particularly advantageous moving device is formed by a monolithically configured base body in the form of a plate or disk which carries the lens group in a preferably central optical area and carries the drive/piezo actuator in a preferably peripheral actuator area. The flexure bearing is in this case formed by defined material cutouts in the plate or disk. It permits a relative movement between the optical area and the actuator area by reversible bending.

Flexure bearings of this kind can be dimensioned from different materials with the aid of known FEM simulations.

Advantageously, a second drive or piezo actuator can be provided in order to permit a movement of the lens group or at least one part thereof in a second direction parallel to the plane of the camera sensor. Of course, individual lenses of the lens group can also be moved by drives or piezo actuators that are offset by 90° from each other.

In a preferred embodiment of a digital microscope, the movable lens group is part of a separate zoom assembly.

In a further embodiment, the movable lens group can be mounted as a complete lens group in the base body/the pixel shift unit. The pixel shift unit is in this case preferably configured as a two-axis system which receives both the lens group, or at least one part thereof, and the one or more drives or piezo actuators, wherein the flexure bearing is arranged between these assemblies.

In alternative embodiments, it is possible that only a single lens of the lens group is moved, or two of the lenses are moved by in each case one piezo actuator. The base body can in this case be formed as a two-dimensional or three-dimensional structure.

In another advantageous embodiment with two drives, the image-capturing device further includes a regulating unit which controls the first and the second drive in such a way that the imaging is moved to three different defined pixel shift positions successively in a continuous loop, wherein in each case one image is taken with the camera sensor after each pixel shift position is reached. In an image processing unit, these individual images are computed to give a high-resolution image. Moreover, in a known manner, the information concerning the individual images is used for different color, edge and image corrections.

A digital microscope, according to the invention, includes an image-capturing device having the features described above. It is immaterial whether the optical unit is integrated in an objective or a zoom assembly or in a zoom objective. The optical unit is preferably part of the zoom assembly integrated in an optical engine. The optical engine in this case also includes the image processing unit.

BRIEF DESCRIPTION OF THE DRAWINGS

Preferred embodiments of the invention are explained in more detail below with reference to the figures, in which.

DETAILED DESCRIPTION

Figure 1:
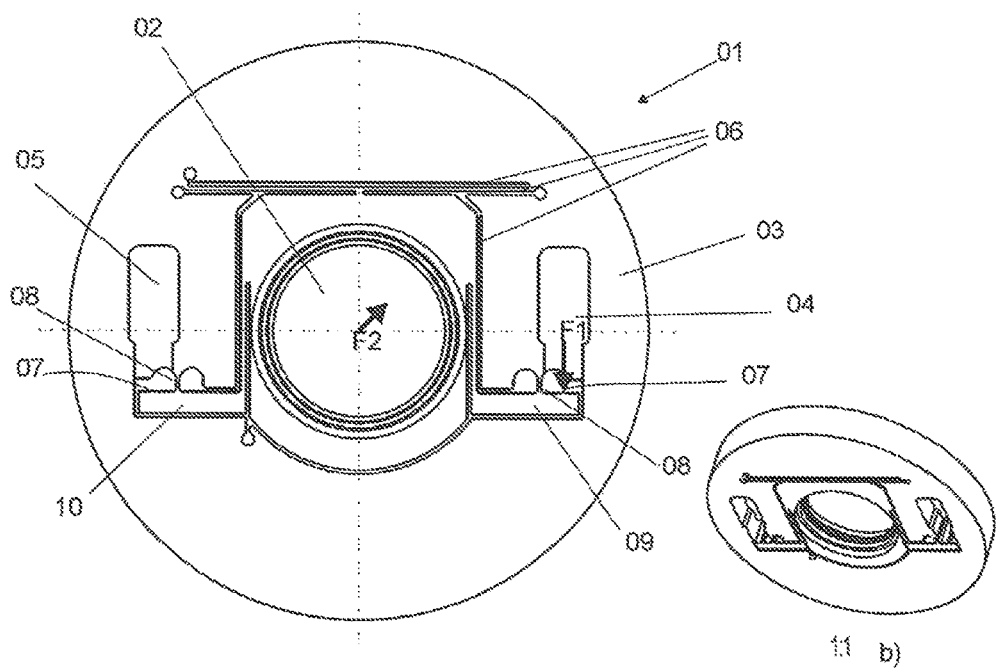
FIG. 1 shows a first preferred embodiment of a flexure bearing for a moving device (pixel shift unit)

FIG. 1 shows a first preferred embodiment of a flexure bearing for a moving device according to the invention in a plan view (FIG. a) and a perspective view (FIG. b). A monolithic base body 01 is disk-shaped and has, in its central area, a lens opening 02 in which a lens or a lens group (not shown) can be received. In the embodiment shown, the base body 01 is produced from an aluminum plate with a thickness of 5 mm. This embodiment advantageously affords good stiffness and stability and favorable conditions for a lens mount. Machining by means of erosive processes is possible.

In alternative embodiments, it is possible to use other materials, for example plastic (optionally fiber-reinforced), or other materials. The dimensions are to be suitably adapted according to the choice of material.

Two recesses 04, 05 for receiving piezo actuators are arranged in a peripheral area 03 of the base body 01.

It will be clear to a person skilled in the art that it is in principle possible here to use any other suitable drive, which may be formed, for example, by a rotatable cam disk or a cam or in some other way.

Between the recesses 04, 05 and the central area, i.e. the lens opening 02, axially continuous slits 06 are worked into the base body 01 in order to form the flexure bearing. One contact surface 07 is provided per recess 04, 05, on which a force is exerted by the extended piezo actuator.

As a result of a mechanical pretensioning of the flexure bearing and the interaction between a lever 09, 10, pivotable about a rotation point 08, and the slits 06 in the base body 01, the lens opening 02 moves according to the dimensioning of the flexure bearing.

In a modified embodiment, a piezo actuator could be arranged on each side of the levers 9, 10, such that an active lever movement is achieved in both directions under the control of in each case one of the piezo actuators.

The travel for the respective piezo actuator can be optimized by the action of the different levers within the flexure bearing. Through the dimensioning of the levers 09, 10 and slits 06, the piezo actuator can also be selected in respect of its force effect. It should be noted in this connection that, with an increased force effect, a reduced travel is possible. A person skilled in the art will be able to select and dimension the piezo actuator suitable for the flexure bearing.

In this embodiment, the flexure bearing is formed by leaf springs remaining between the slits 06, by the levers 9, 10 and by the rotation points 08.

In the case shown, a force F1 of a first piezo actuator would be transmitted by means of the flexure bearing to the lens opening and would there trigger a movement in direction F2 (rotated through 135°). These are movements in the micrometer range and cannot be illustrated true to scale in the figure. The indicated force arrows F1 and F2 serve merely to illustrate the principle involved, and their length is not in any way related to the exerted force or distance of the movement. For example, if the lens opening 02 is to be moved in the direction of 12 o'clock, both levers 09 and 10 have to be moved in the direction of 6 o'clock, i.e. moved by extension of the (two) drives.

In principle, the flexure bearing or the lens mount is designed such that a lateral or off-centered force input F1 provides a resulting movement, rotated through 135° (in the mathematically positive sense of rotation), in the direction F2 (away from the center). By force input of the opposite, second piezo actuator on the lever 10, a movement is achieved which is offset by 90° to the previous direction F2. In this way, by targeted control of the opposite piezo actuators, it is possible to generate an exact and symmetrical and linear adjustment of the lens in two directions perpendicular to each other and perpendicular to the optical axis.

For a pixel shift cycle, the lens opening is to be moved in a manner known per se by the corresponding number of steps. A corresponding algorithm has to be chosen in the control and deflection of the piezo actuators.

Figure 2:
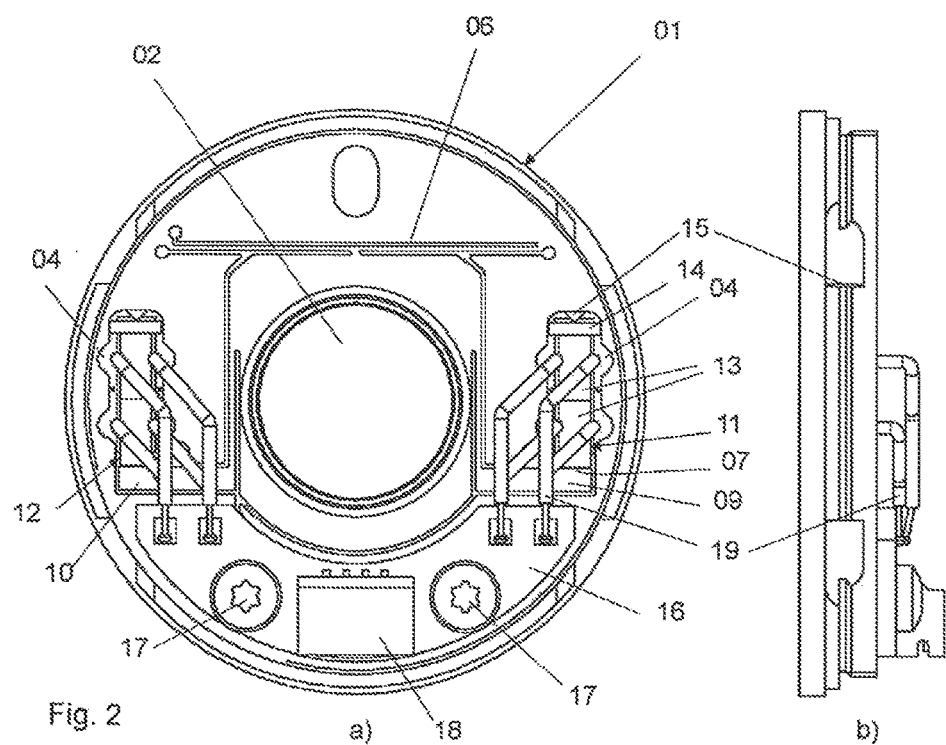
FIG. 2 shows an enlarged detail view with different positions of the flexure bearing according to FIG. 1.

FIG. 2 shows a moving device with the base body 01 already explained with reference to FIG. 1, in a plan view (FIG. a) and in a side view (FIG. b).

A stack 11 of two piezo actuators 12, 13 is received in each of the two recesses 04 and 05. The stacks 11 are each subject to a defined pretensioning by means of a plate 14 and a threaded pin 15 held in the base plate 01 (see FIG. 3b).

In alternative embodiments, it is of course possible to use piezo actuators with integrated pretensioning or arrangements with active pretensioning (two actuators working against each other, symmetrically acting push-pull drives).

A printed circuit board 16 is preferably secured on the base body 01 by means of screws 17. An electronic drive circuit 18, and lines 19 leading to the piezo actuators 13, are provided on the printed circuit board 16.

Figure 3:
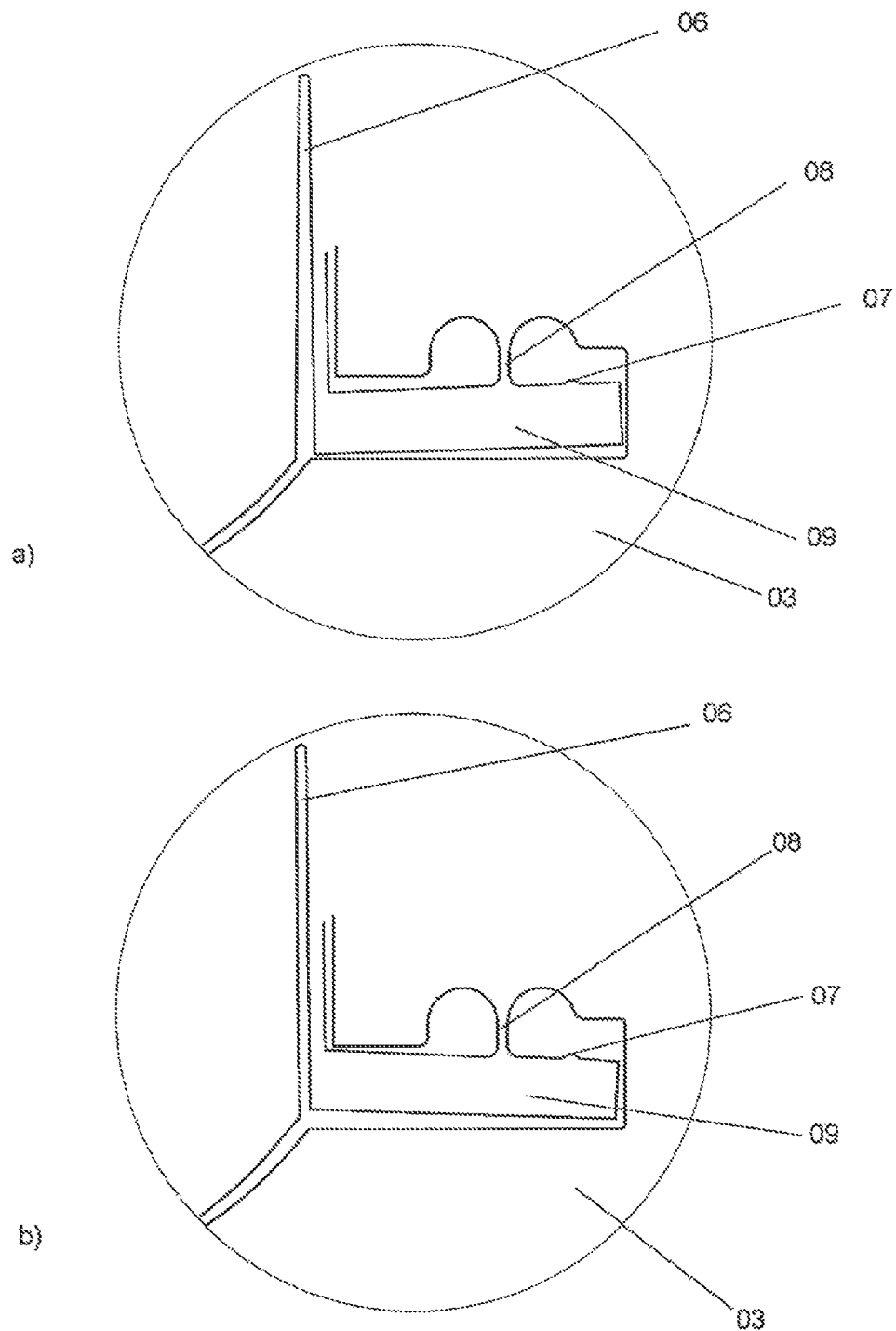
FIG. 3 shows a moving device with a flexure bearing according to FIG. 1.

FIG. 3 shows, in a detail view not true to scale, two end positions (FIGS. a and b) of the lever 9 according to FIG. 1. FIG. a shows a pretensioned first end position, and FIG. b shows a second end position. The first end position is set, during assembly of the pixel shift unit, by mechanical pretensioning by means of the threaded pin 15. There should as far as possible be no contact of the lever 09 with the peripheral area 03. FIG. b shows the second end position of the lever 09, which can be controlled by activation or complete deflection of the stack 11 (not shown here).

Figure 4:
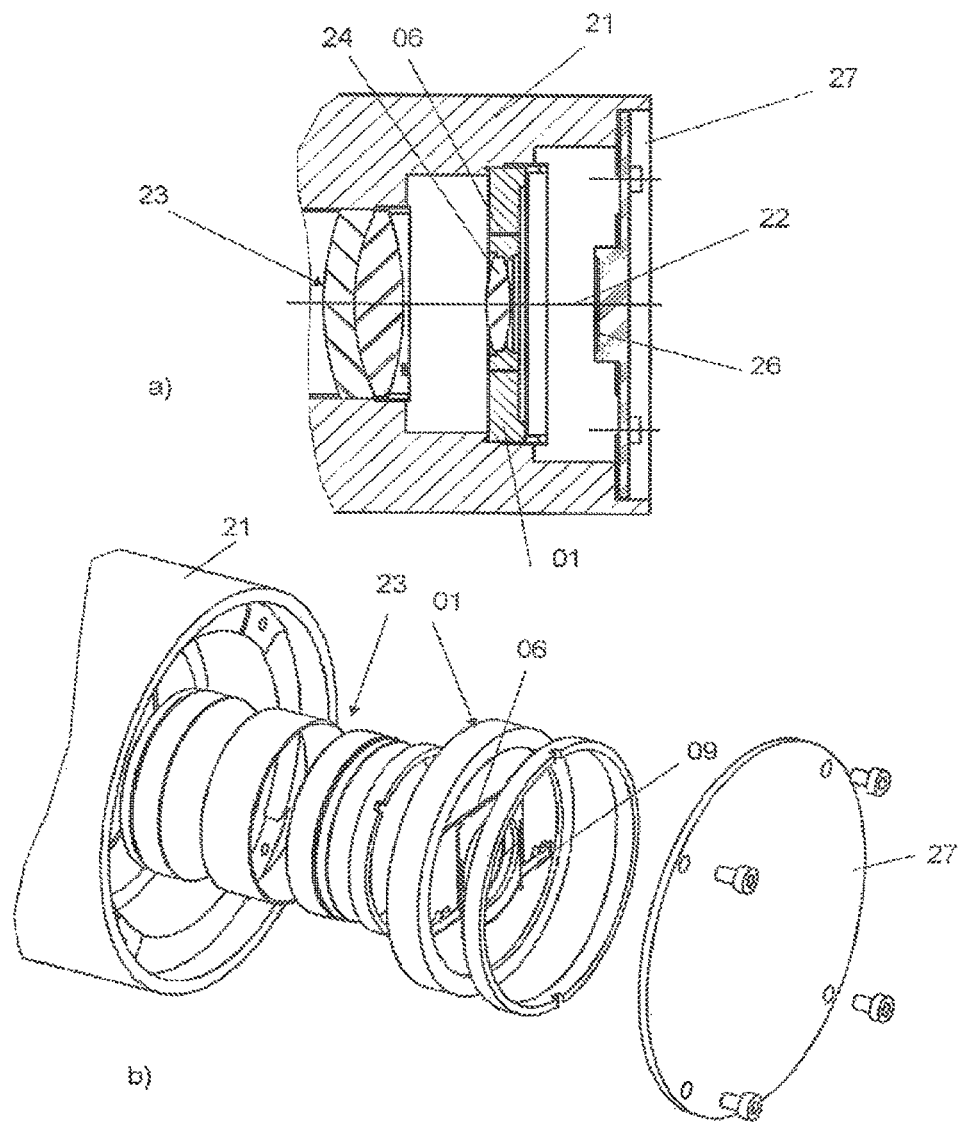
FIG. 4 shows a view of part of a digital microscope with the moving device shown in FIG. 3.

FIG. 4 shows the above-described moving device integrated in an optical unit of a digital microscope. Only a portion of a main housing is shown, in a longitudinal sectional view (FIG. a) and in an exploded view (FIG. b).

On an optical axis 22, an axially movable lens group 23, a lens group 24 movable perpendicularly with respect to the optical axis 22, and a camera sensor 26 on a base plate 27 are arranged in a cylindrical housing 21.

The lens group 24 is a PLUS-MINUS group, which is mounted in the base body 01 of the moving device.

Figure 5:
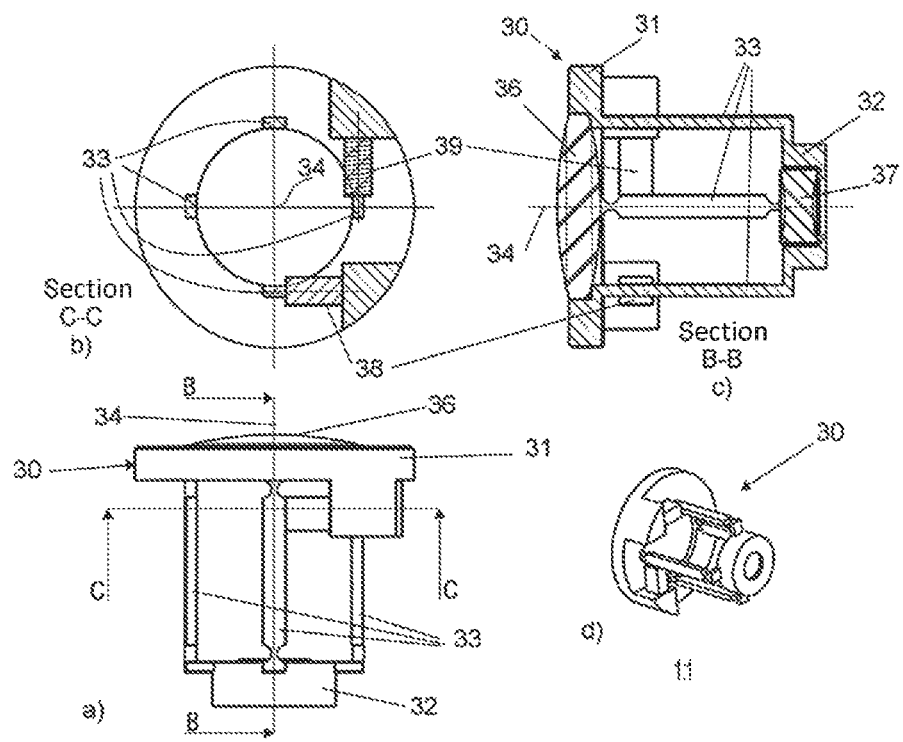
FIG. 5 shows a second preferred embodiment of a moving device according to the invention in different views.

FIG. 5 shows a second preferred embodiment of a moving device according to the invention for a digital microscope, in a side view (FIG. a), in sectional views (FIGS. b and c), and in a perspective view (FIG. d). In this embodiment, a base body 30 with a monolithic three-dimensional structure is formed.

The base body 30 has a first ring 31, a second ring 32, and four webs 33 extending axially between the rings 31, 32, said webs 33 each being offset from each other by 90° about the optical axis 34 and extending parallel thereto. In a particularly advantageous embodiment, the arrangement of the webs 33, or their distance from the optical axis 34, corresponds to the format of the camera sensor.

The first ring 31 carries a positive group 36, and the second ring 32 carries a negative group 37. The piezo actuators 38, 39, offset by 90° from each other and perpendicular to the optical axis 32, act on two of the webs 33 in the axial area of the positive group 36, such that, upon actuation of one or both piezo actuators 38, 39, they are moved out from the optical axis 32.

Figure 6:
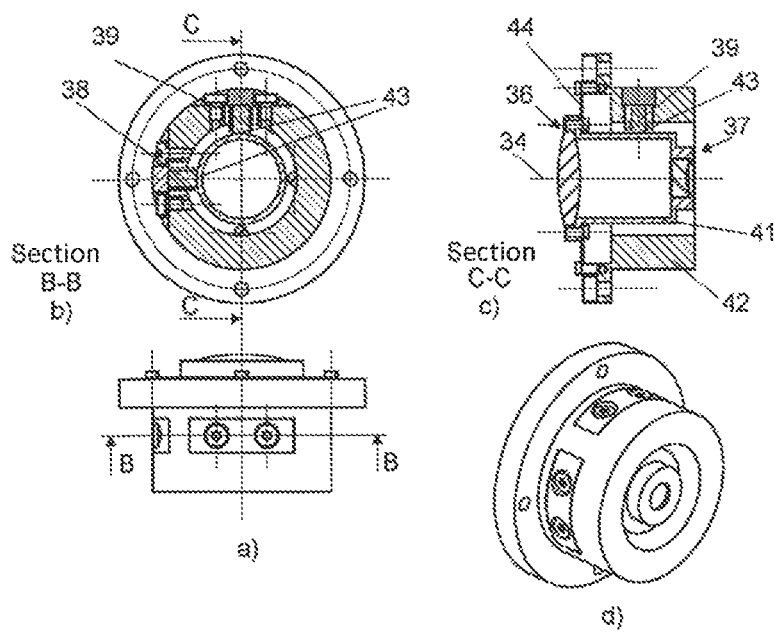
FIG. 6 shows a third preferred embodiment of a moving device according to the invention in different views.

A third embodiment, in which the positive group 36 and the negative group 37 are tilted relative to each other, is shown in FIG. 6. In the latter, FIG. a shows a side view, FIG. b shows a sectional view along the section line B-B in FIG. a, FIG. c shows a sectional view along the section line C-C in FIG. b, and FIG. d shows a perspective view.

The optical unit is here positioned at the center of a gimbal-mounted pivot device. The base body is in multiple parts in this embodiment. It comprises an inner sleeve 41, in which the positive group 36 and the negative group 37 are mounted, and an outer sleeve 42 (periphery) in which the piezo actuators 38, 39 are mounted, wherein these each have a contact surface 43 on the inner sleeve 41.

In this embodiment, the flexure bearing is formed by a cardan disk 44 which has two half-ring slits per drive, wherein the rings of each drive are offset from each other by 90°. The disk 44 connects inner sleeve 41 and outer sleeve 42. The webs remaining between the slits define the rotational axes in the plane of the disk 44.

The rotational axes are preferably at a distance from the optical units 36, 37 such that, with rotation in the rotational axis aligned with the sensor, the optical unit pivots out from the optical axis 34. By actuation of the piezo actuators 38, 39, the center is moved in the required direction.

The rotational axes advantageously lie between the positive group 36 and the negative group 37, since the components achieve opposite effects which add up with this arrangement, as a result of which shorter travel distances may be sufficient.

The invention claimed is:

1. An image-capturing device for a digital microscope, comprising
    a camera sensor,
    an optical unit for imaging a sample in an image plane on the camera sensor, wherein the optical unit comprises at least one lens group which is mounted so as to be movable perpendicularly with respect to an optical axis,
    a moving device with a first drive for a relative movement of at least one part of the at least one lens group and thus of the imaging of the sample on the camera sensor parallel to the image plane,
    a second drive, wherein the second drive is coupled to the moving device via a second flexure bearing formed in the moving device,
    wherein the first drive is coupled to the at least one lens group via a first flexure bearing formed in the moving device,
    wherein the first flexure bearing is formed in a monolithic base body, in a radially central area of which a movable part of the at least one lens group is mounted in a lens opening, and in a radially peripheral actuator area of which a contact surface for the first drive is provided, and
    wherein the monolithic base body is a two-axis system, of which a central platform forms a lens mount, and in a periphery of which the first and second drives are mounted, and wherein the first and second flexure bearings are formed between the central platform and the periphery, and contact surfaces for the first and second drives are provided in the periphery.

2. The image-capturing device as claimed in claim 1, wherein the first drive is a piezo actuator.

3. The image-capturing device as claimed in claim 1, wherein the monolithic base body is disk-shaped and has slits which extend at least in part around the lens opening.

4. The image-capturing device as claimed in claim 1, wherein the first flexure bearing is mechanically pretensioned about an excursion path of the first drive.

5. The image-capturing device as claimed in claim 1, wherein it comprises a regulating unit which controls the first and second drives in such a way that the imaging is moved to three different defined pixel shift positions successively in a continuous loop, wherein in each case one image is taken with the camera sensor after each pixel shift position is reached.

6. A digital microscope comprising an image-capturing device as claimed in claim 1.

7. The digital microscope as claimed in claim 6, wherein the movable lens group is integrated in a zoom assembly of the digital microscope.

* * * * *